United States Patent
Shintani

(10) Patent No.: US 7,389,522 B1
(45) Date of Patent: Jun. 17, 2008

(54) DEVICE AND METHOD FOR RECEIVING INFORMATION AND DEVICE AND METHOD FOR TRANSMITTING INFORMATION

(75) Inventor: Peter Shintani, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/242,485

(22) PCT Filed: Jun. 19, 1998

(86) PCT No.: PCT/JP98/02742

§ 371 (c)(1),
(2), (4) Date: Nov. 15, 1999

(87) PCT Pub. No.: WO98/58499

PCT Pub. Date: Dec. 23, 1998

(30) Foreign Application Priority Data

Jun. 19, 1997 (JP) .................................. 9-162405

(51) Int. Cl.
*H04N 7/16* (2006.01)
*H04N 7/173* (2006.01)

(52) U.S. Cl. .................. 725/8; 725/23; 725/24; 725/104

(58) Field of Classification Search .................. 725/1–8, 725/23–24, 104
See application file for complete search history.

(56) References Cited

U.S. PATENT DOCUMENTS

| 4,876,592 A | 10/1989 | Von Kohorn |
| 5,057,915 A | 10/1991 | Von Kohorn |
| 5,155,591 A | 10/1992 | Wachob |
| 5,227,874 A * | 7/1993 | Von Kohorn .................. 705/10 |
| 5,270,809 A * | 12/1993 | Gammie et al. .............. 725/114 |
| 5,532,735 A * | 7/1996 | Blahut et al. .................. 725/32 |
| 5,610,653 A | 3/1997 | Abecassis |
| 5,838,314 A * | 11/1998 | Neel et al. ...................... 725/8 |
| 5,855,008 A * | 12/1998 | Goldhaber et al. ............ 705/14 |
| 5,880,720 A * | 3/1999 | Iwafune et al. ................. 725/24 |
| 5,902,983 A * | 5/1999 | Crevelt et al. ................ 235/380 |
| 5,915,243 A * | 6/1999 | Smolen ........................ 705/14 |
| 6,012,039 A * | 1/2000 | Hoffman et al. .............. 705/14 |
| 6,057,872 A * | 5/2000 | Candelore ..................... 725/23 |
| 6,256,614 B1 * | 7/2001 | Wecker et al. ................. 705/14 |
| 6,553,178 B2 * | 4/2003 | Abecassis ..................... 386/83 |

FOREIGN PATENT DOCUMENTS

| EP | 0 656 728 | 6/1995 |
| EP | 0 680 214 | 11/1995 |
| JP | 63-146592 | 6/1988 |
| JP | 7 203420 | 8/1995 |
| JP | 9-46453 | 2/1997 |
| WO | WO 97 22074 | 6/1997 |

* cited by examiner

*Primary Examiner*—Hunter B. Lonsberry
(74) *Attorney, Agent, or Firm*—Frommer Lawrence & Haug LLP; William S. Frommer; Thomas F. Presson

(57) ABSTRACT

The present invention makes viewers surely view commercial programs.

When a commercial program is broadcasted and displayed on a display (7A), a viewer is requested a response. The viewer operates a prescribed key in the ten key (32) of a remote controller (31) for response. If the viewer responds to the response request of the commercial program, points are added to a smart card (10). The viewer can view a pay program using the points recorded in the smart card (10).

4 Claims, 6 Drawing Sheets

YOU HAVE 125 POINTS AT PRESENT
YOU CAN SELECT FOLLOWING
MERCHANDISE WITH THIS POINTS:
   1 CAMERA
   2 VIDEO TAPE RECORDER
   3 CD PLAYER

DEVICE AND METHOD FOR RECEIVING INFORMATION AND DEVICE AND METHOD FOR TRANSMITTING INFORMATION

FIELD OF THE ART

The present invention relates to an information receiving device and its method, and an information transmission device and its method, and particularly relates to an information receiving device and its method, and an information transmission device and its method which operate points corresponding to a response from a viewer to a request for response from a response program to make the viewer surely view the program using this points.

BACKGROUND ART

In recently years, a television broadcasting has been digitized and programs of extremely many channels are provided for viewers. Thus the viewers can select and view a desired program from these many programs.

On the other hand, a program's provider (broadcasting station) provides the viewers a commercial program to advertise predetermined merchandise and receiving a consideration for it from the sponsor of that merchandise (manufacturer or seller). Thus the viewers can view the program free. And the sponsor can advertise that providing merchandise to the viewers by that commercial program.

Generally, however, since many viewers unfortunately go or switch over the channel as well as the broadcasting of a commercial program is started, a problem that the provider of a commercial program cannot surely advertise the merchandise to the viewers is caused.

DISCLOSURE OF INVENTION

Considering the above points, the present invention makes viewers surely view commercial programs.

An information receiving device comprises a receiving means for receiving a program to be transmitted, an operation means for operating points corresponding to a viewer's response to the response request of a response program which requests a viewer's response, and a recording means for recording specifying information to specify a response program, and the points operated by the operation means at least, when the program received by the receiving means is a response program.

A method for receiving information comprises a receiving step for receiving a program to be transmitted, an operation step for operating points corresponding to a viewer's response to the response request of a response program which requests a viewer's response, and a recording step for recording specifying information to specify a response program, and the points operated by the operation step at least, when the program received by the receiving step is the response program.

An information transmission device includes a transmission means for transmitting a program, and transmits a response program which requests a viewer's response and specifying information to specify that response program together by the transmission means.

A method for transmitting information includes a transmission step for transmitting a program is provided, and transmits a response program which requests a viewer's response and specifying information to specify that response program together by the transmission step.

BRIEF DESCRIPTION OF DRAWINGS

FIG. 8 is a diagram showing a display example in step S52 in FIG. 7.

BEST MODE FOR CARRYING OUT THE INVENTION

The present invention will be described in detail with reference to the accompanying drawings.

Figure 1:
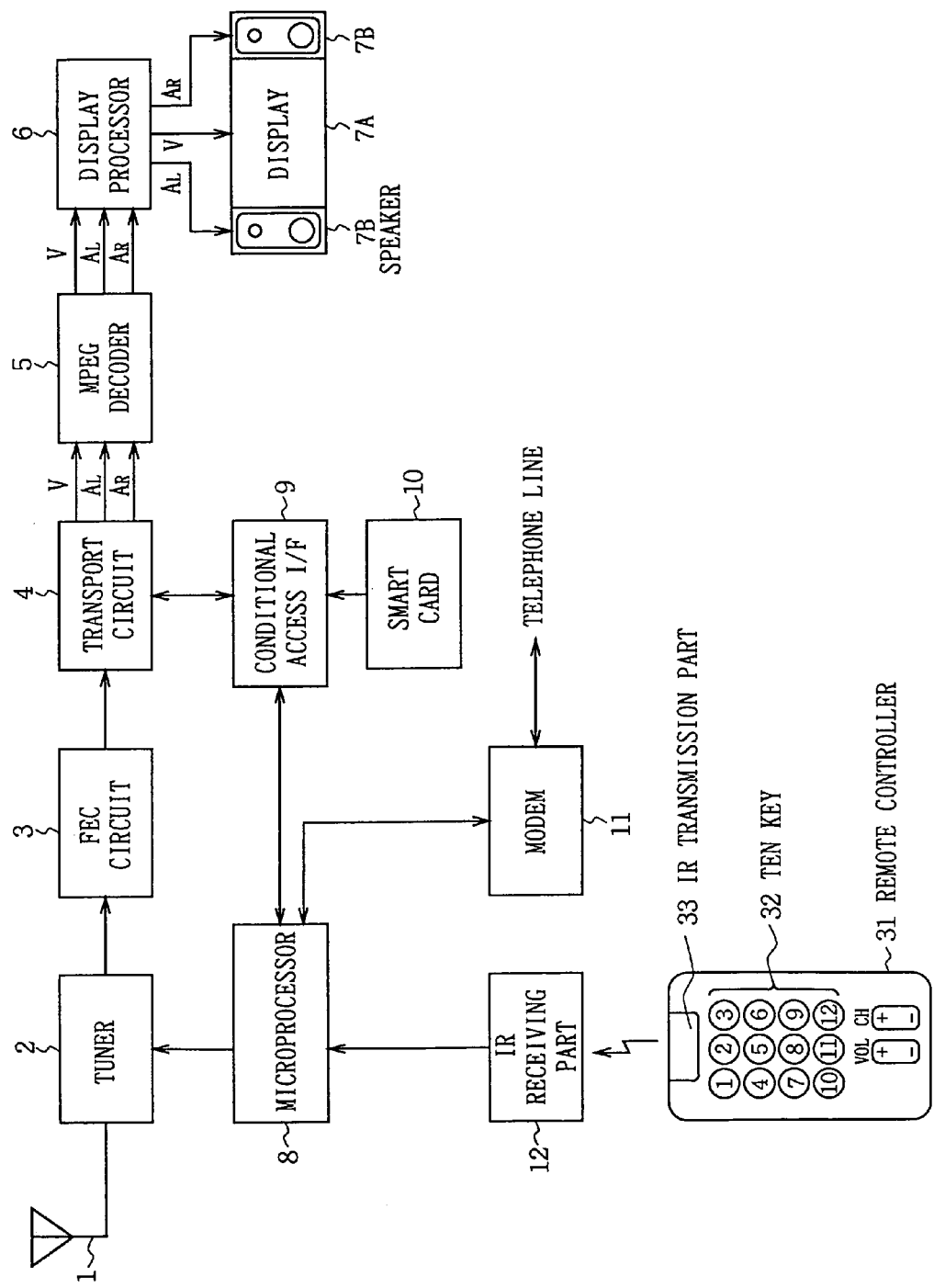
FIG. 1 is a block diagram showing an example of the configuration of a digital television signal receiving device to which the present invention is applied.

FIG. 1 shows an example of the configuration of a digital television broadcasting receiving device to which the present invention is applied. A tuner 2 receives digital television broadcasting of a specified channel via an antenna 1 and outputs the demodulated signal. An FEC circuit 3 performs error correction of the signal supplied from the tuner 2 and outputs a resultant signal to a transport circuit 4. The transport circuit 4 separates video data V, left and right audio data $A_L$ and $A_R$, and control data from the signal inputted from the FEC circuit 3 and outputs the video and audio data to an MPEG decoder 5 as well as outputting the control data which includes data on conditional access relating to the contents of broadcasting receiving contract with viewers to a conditional access interface 9.

The MPEG decoder 5 decodes the inputted video data and audio data and outputting the decoded data to a display processor 6. The display processor 6 processes the inputted video data and audio data to convert into an analog video signal and an audio signal, and outputting them to a display 7A and speakers 7B respectively.

A smart card 10 can be attached to the conditional access interface 9. A microprocessor and a memory are built in this smart card 10 to store ciphered information on the contents of contract with viewers, ciphered information on accounting of pay programs, etc.

The microprocessor 8 controls each part to execute receiving processing. A modem 11 can transmit/receive various data and commands or the like via a telephone line.

An IR receiving part 12 receives an IR signal to be transmitted from the IR transmission part 33 of a remote controller 31 that has various keys in addition to a ten key 32, and outputs the detected signal to the microprocessor 8. The viewer can input various commands to the microprocessor 8 by operating the various keys of the remote controller 31.

The operation of this device will be described hereinafter, referring to a flow chart of FIG. 2. When viewing a program, the viewer specifies a receiving channel by operating the ten key 32, for example. An IR signal corresponding to this specified channel is generated from the IR transmission part 33 of the remote controller 31. If receiving this signal via the IR receiving part 12, the microprocessor 8 instructs the tuner 2 to receive the specified channel. The tuner 2 receives the radio wave of the specified channel and outputting the demodulated signal. The FEC circuit 3 performs error correction to the signal of the inputted channel, and then outputs the resultant data to the transport circuit 4.

The transport circuit 4 separates control data from the inputted data, and outputs this to the smart card 10 via the conditional access interface 9. The smart card 10 refers conditional access data in the control data inputted from the transport circuit 4 to the contract condition of the viewers previously stored to determine whether or not it is a program permitted to view. As a result, if it is the program permitted to view, the transport circuit 4 is controlled via the conditional access interface 9, while if the data inputted from the FEC circuit 3 is the data ciphered or interleaved, it is decoded or deinterleaved.

The MPEG decoder 5 decodes video data and audio data supplied from the transport circuit 4 and outputting the decoded data to the display processor 6. The display processor 6 processes the inputted video data and audio data to convert into an analog video signal and an audio signal, and outputting them to the display 7A and the speaker 7B respectively.

Figure 2:
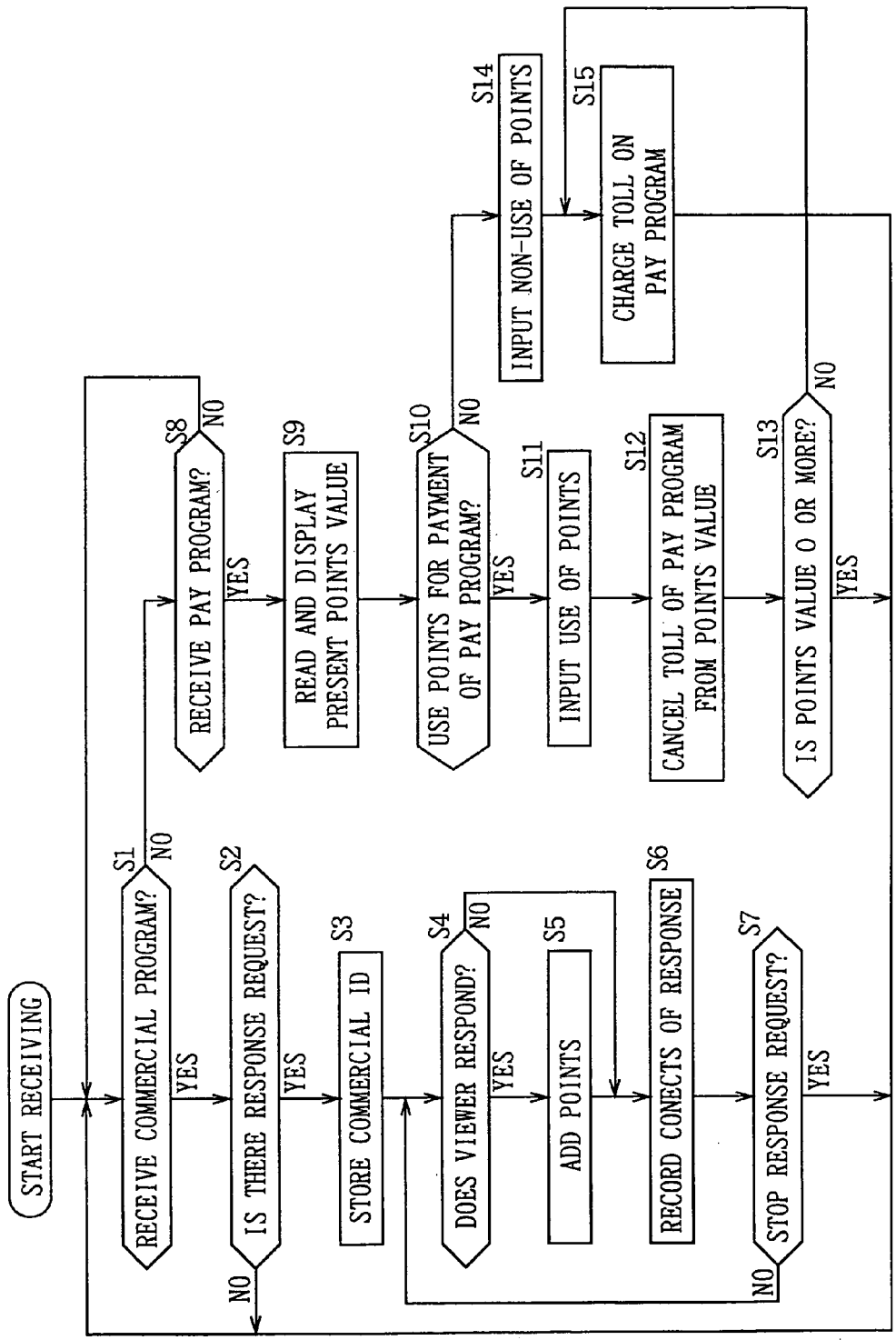
FIG. 2 is a flow chart explaining the operation of the embodiment of FIG. 1.

When such receiving processing is performed, the conditional access interface 9 executes a processing shown in the flow chart of FIG. 2. In step S1, first, it is determined whether or not the tuner 2 is now receiving a commercial program. Note that, in this specification, also a commercial program for advertising a predetermined merchandise, service, etc., (hereinafter, it is simply referred to as merchandise) to the viewers is regarded as one of programs other than programs such as a drama, news, a movie, etc.

If the program now received is a commercial program, it goes to step S2 and the conditional access interface 9 determines whether or not the commercial program is a program which requests the viewer to respond. It can be determined on a receiving side, by transmitting a flag showing whether or not to be a response request program from the program transmission side, from this flag. If the program now received is a response request program, the conditional access interface 9 makes the memory built in the smart card 10 store the ID of the commercial program now received.

Figure 3:
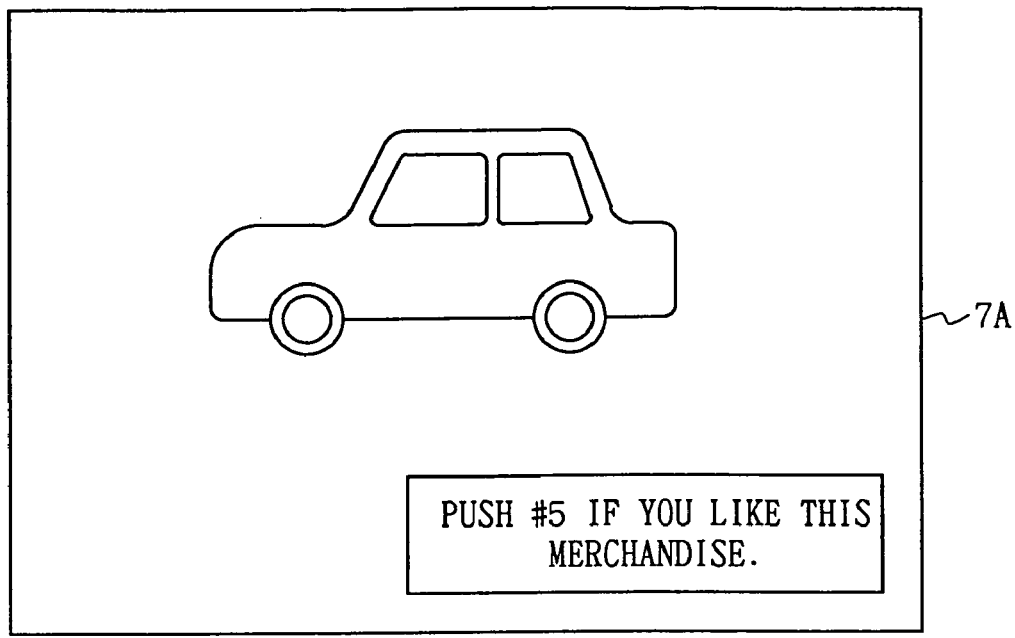
FIG. 3 is a diagram showing a display example on a display 7A of FIG. 1.

In the response request program, a picture to advertise a merchandise is displayed, and then, as shown in FIG. 3, a message like "Push the number 5 if you like this merchandise." is displayed. If responding to this message, the viewer operates the number 5 key in the ten key 32 of the remote controller 31. A signal corresponding to this number 5 key is outputted from the IR transmission part 33 in the remote controller 31 as an IR signal. This signal is received by the IR receiving part 12, and the detected signal is supplied to the microprocessor 8. If this detected signal is inputted to, the microprocessor 8 outputs a signal showing that the number 5 key was operated to the conditional access interface 9.

In step S4, the conditional access interface 9 monitors the signal from the microprocessor 8 to determine whether or not the viewer responded to the response request of the commercial program. If his response is determined, the conditional access interface 9 goes to step S5 to add a prescribed value to points stored in the smart card 10, while if the viewer does not respond to the response request of the commercial program, the points adding processing in step S5 is skipped. Note that, if the viewer does not respond to the response request, the points may be actively subtracted in addition to adding no points, as occasion demands.

Then, the conditional access interface 9 goes to step S6 to record the contents of the viewer's response in the smart card 10 along with the ID of the commercial program or the like. In step S7, whether or not the response request has completed in the commercial program is determined. If it has not completed yet, the conditional access interface 9 returns to step S4 to repeatedly execute the processing after S4. If the completion of the response request is determined, it returns to step S1 to repeatedly execute the processing after S1.

In addition, it may make the viewer answer a questionnaire, for example, by requesting to input the viewer's age who operated the response to the merchandise, or by making him selectively input his favorite color, or the like. And thus response results can be recorded in the smart card 10.

In step S1, if it is determined that the program now received is not a commercial program, the conditional access interface 9 goes to step S8 to determine whether or not the program now received is a pay program. If the program now received is not a pay program, it returns to step S1. Accordingly, when a free normal program is broadcasted, the processings of step S1 and step S8 are repeatedly executed.

Figure 4:
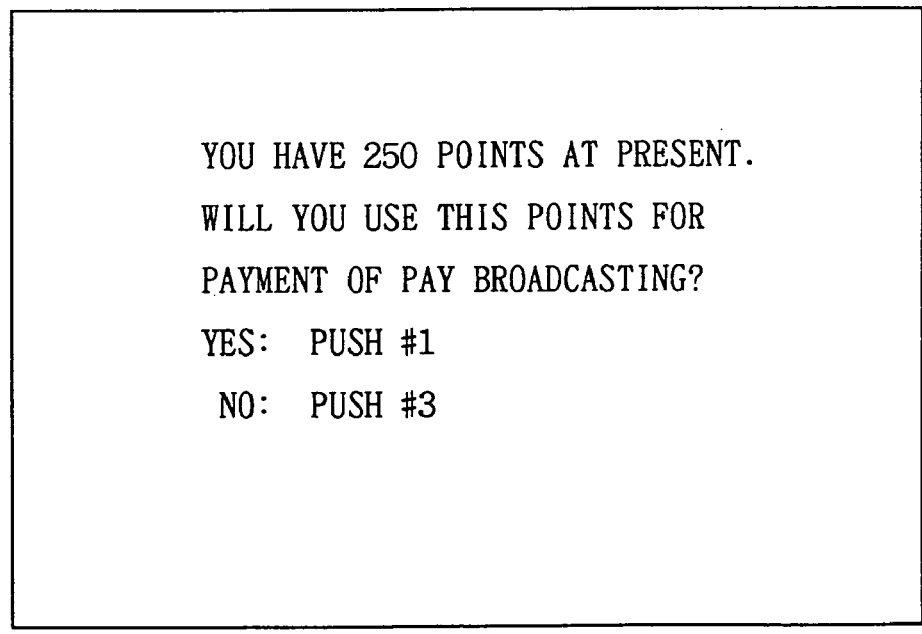
FIG. 4 is a diagram showing a display example on the display 7A of FIG. 1.

In step S8, if it is determined that a pay program is being received now, the conditional access interface 9 goes to step S9 to read out the points now stored in the smart card 10 and displaying it on the display 7A together with a message like "Will you use this points for a payment for pay broadcasting?", as shown in FIG. 4, for example. The viewer determines whether or not to use the present points for the payment for pay broadcasting. If using it, the viewer operates a number 1 key corresponding to YES in the ten key 32 of the remote controller 31 in step S11. While if not using it, the viewer operates a number 3 key corresponding to NO in step S14.

If an input showing that the points are to be used for the payment for pay broadcasting is obtained, in step S12, a processing to cancel points corresponding to the toll of pay broadcasting from the present points is executed. That is, the conditional access interface 9 subtracts points corresponding to the toll of a pay broadcasting now to be received from the present points stored in the smart card 10. For example, if the present points are 250 points and a toll of the program corresponds to 50 points, new points becomes 200 points, and if a toll of the program corresponds to 300 points, new points becomes −50 points.

Then, in step S13, whether or not the points after the update are 0 or more is determined. If it is 0 or more, the conditional access interface returns to step S1 without conducting an accounting in step S15.

While if the points after the update are smaller than 0 (if it is minus) or subsequently to the processing of step S14, the conditional access interface 9 goes to step S15 to execute the accounting to the toll of the pay program. At this time, if an input showing that the points are not to be used for the payment for the pay broadcasting is obtained in step S14, the conditional access interface 9 executes a normal accounting. That is, the toll of the pay broadcasting program now viewed is added to a toll of reception until then, stored in the smart card 10. On the contrary, if the points after the update are minus resulted from the cancellation of the pay broadcasting toll by the points, a part of the toll corresponding to that minus points is added.

As the above manner, points are added when the viewer responds to the response request of a commercial program. Thereby, the viewer can view a pay program at a reduced toll by the added points.

Such service cannot be received only if the user responds to a response request in a commercial program. For example, this service cannot be received only if the viewer simply watches the commercial program or records it to a video tape. Moreover, since the time of the response request is uncertain in the commercial program, the viewer cannot receive this service only if he views the commercial program from the beginning to the end. As a result, the program's provider can make the user surely view the commercial program.

Figure 5:
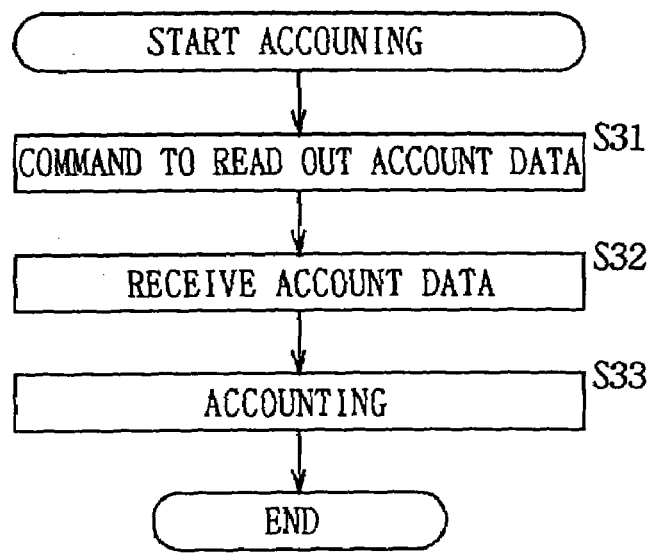
FIG. 5 is a flow chart explaining an accounting in the embodiment of FIG. 1.

The accounting of pay program will be described hereinafter with reference to a flow chart of FIG. 5. In step S31 the program's provider commands to read out account data stored in the smart card 10 of a specified viewer. This command can be performed by broadcasting an ID to specify the viewer or transmitting via a telephone line, for example. If a readout of the account data is commanded via radio waves, the readout command is supplied to the conditional access interface 9 via the transport circuit 4. While if this read command is outputted via a telephone line, this command is inputted to the microprocessor 8 from the modem 11. The microprocessor 8 outputs this command to the conditional access interface 9.

If the readout of account data is commanded in this manner, the conditional access interface 9 reads the account data until then, stored in the smart card 10, and outputs this to the microprocessor 8. If receiving the input of the account data, the microprocessor 8 controls the modem 11 to transmit this to the commander of readout via the telephone line. On the program's provider side, this account data is received in step S32. Then, the accounting corresponding to the received account data is executed in step S33. For example, a debit note corresponding to the account data is issued to that viewer or the settlement of the account is performed by a credit card.

Figure 6:
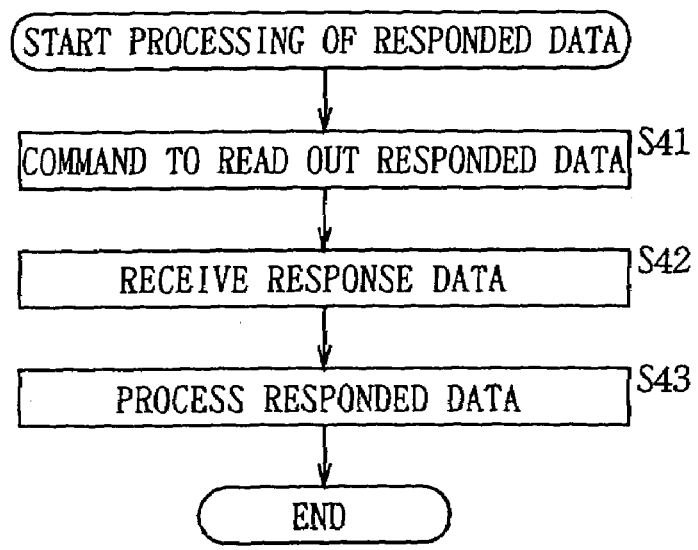
FIG. 6 is a flow chart explaining the processing of responded data in the embodiment of FIG. 1.

Furthermore, the program's provider can collect responded data recorded in the smart card 10 by a processing shown by a flow chart of FIG. 6. In step S41, a responded data read command is first outputted to the specified viewer. This read command can be outputted via the radio wave or the telephone line similarly to the account data read command in step S31 of FIG. 5. On the receiving side, responding to this, the conditional access interface 9 reads the responded data stored in the smart card 10 (data recorded in step S6 of FIG. 2) along with the commercial ID, and outputting them to the microprocessor 8. The microprocessor 8 controls the modem 11 to transmit these responded data and commercial ID to the provider of the commercial program via the telephone line. On the commercial program's provider side, this responded data is received by step S42. Then, the responded data received in step S42 is processed in step S43.

As described above, the result of a questionnaire performed via the commercial program is included in this responded data. Thus, in addition to the number of households which viewed that commercial program, the commercial program's provider can obtain detailed data such as a date of viewers who has an interest in the merchandise, a distinction of male/female, etc., by analyzing the answer to this questionnaire. Moreover, also the latest liking and tendency or the like of viewers can be analyzed depending on the contents of a questionnaire. Such information can also be used in the development of new goods, and the information itself can also be offered to others, if necessary.

Note that, such data collection may be performed simultaneously with accounting.

The commercial program's provider can not only make a viewer surely view the commercial program but also collect and analyze the responded data.

Figure 7:
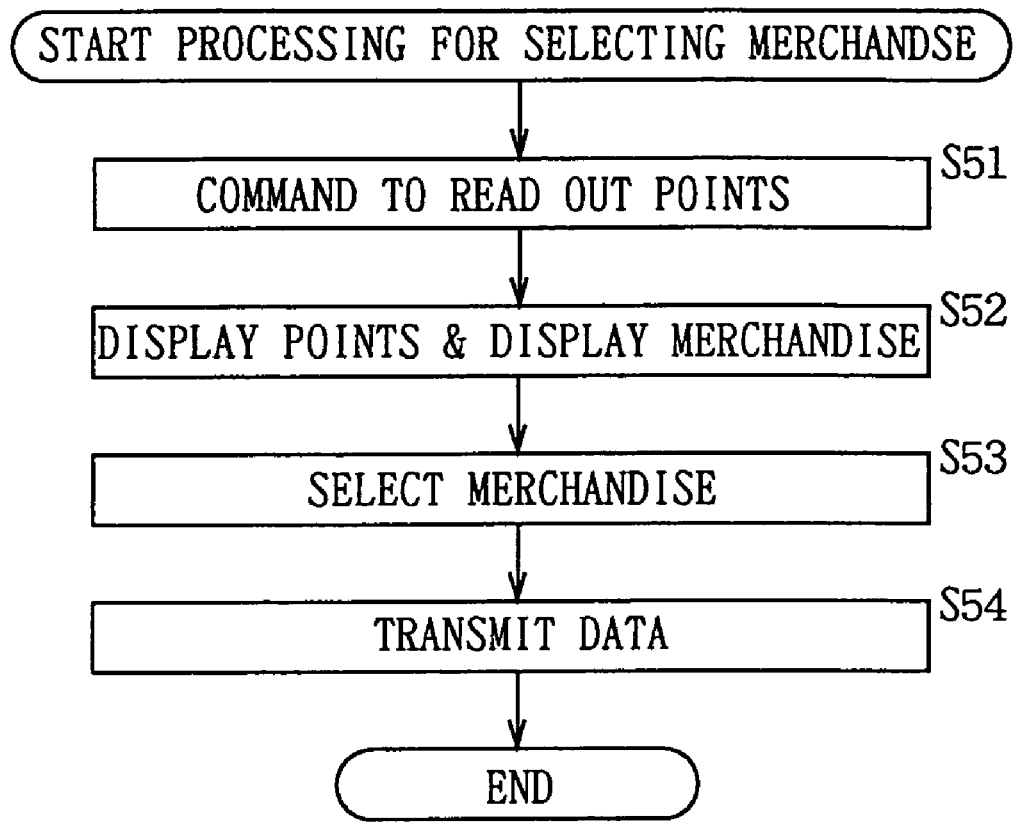
FIG. 7 is a flow chart explaining a processing for selecting merchandise in the embodiment of FIG. 1.

In said example of processing, points are added to the toll of a pay program, however, a merchandise may be presented to a viewer instead of that, for example. FIG. 7 shows an example of processing in this case.

In step S51, the viewer first operates a predetermined key of the remote controller 31 to command the readout of the present points stored in the smart card 10. When this points read command is inputted via the microprocessor 8, in step S52 the conditional access interface 9 reads out and displays the points stored in the smart card 10 on the display 7A, for example, as shown in FIG. 8. At this time, the points and merchandise which can be presented by that points are displayed. In a display example of FIG. 8, it is displayed that the points are 125 points and the merchandise selectable by this points is a camera, video tape recorder or CD player.

The viewer looks at this display and selects a desirous merchandise in step S53. For example, if the camera is desired in the display example of FIG. 8, a number 1 key is operated in the ten key 32 of the remote controller 31. If the video tape recorder is desired, a number 2 key is operated. And if the CD player is desired, a number 3 key is operated.

If a signal to select a merchandise is inputted via the microprocessor 8, the conditional access interface 9 executes a processing for transmitting data showing that the selected merchandise is desired by the viewer, in step S54. That is, at this time, the conditional access interface 9 controls the microprocessor 8 to transmit this data to the commercial program's provider from the modem 11 via the telephone line. If receiving this data transmission, the commercial program's provider performs a processing for delivering the merchandise to the viewer. Note that, after merchandise is selected, the remaining points are reduced by the points corresponding to that merchandise.

Otherwise, the points stored in the smart card 10 may be converted into a coupon at a variety shop and helping the viewer to buy a desired merchandise selling on the shop, for example. Specifically, the user takes the smart card to the shop with him, and reads out all the points by points reader installed in the shop and making zero points remain. Then, the user can receive a coupon corresponding to the points.

In the above embodiment, data is transmitted/received to/from the program's provider side via a telephone line by means of the modem 11. In a cable television system having bi-directional channels or the like, however, the data can be transmitted to a program's provider side by means of up-directional channels.

Besides, in the above embodiment, the points are recorded in the smart card 10. In the case where there are up-directional channels, however, the points may be recorded on a broadcasting station side.

As the smart card 10, PCMCIA (personal computer memory card international association) cards or other cards can be used.

In the above embodiment, a response is requested to the viewer in a commercial program. However, this program is not only limited to the commercial program but also various programs can be used instead.

Furthermore, in the case where a printer is connected to or built in a digital television broadcasting receiving device, a coupon may be outputted from the printer. In this case, since a memory for storing points is not needed to be a memory in a smart card, points may be stored in a memory in the receiving device.

Moreover, in the above embodiment, a commercial ID and responded data are transmitted to a program's provider. However, by transmitting also a commercial ID which received no response, the program's provider can recognize viewers' liking further detailed and can use in the development of goods.

In the above, the case where the present invention is applied to a digital television signal receiving device has been described as an example however, the present invention can also be applied to other information receiving devices.

As described above, according to the present invention, since points are operated corresponding to a viewer's response to a response request by a response program and recording the points, it can make the viewer surely view the program. At the same time, also the viewer side can receive a program at further lower toll by using this points.

INDUSTRIAL CAPABILITY

In a digital television broadcasting, a commercial program in the form of questionnaire with a benefit is broadcasted. Thereby, the propaganda effect of the commercial program is improved, and liking data for merchandise of viewers can be surveyed.

The invention claimed is:

1. An information receiving device for viewing programs, comprising:
   receiving means for receiving a program for viewing by a viewer;
   determining means for determining whether said program is a commercial program or a pay program;
   wherein if said program is determined as said commercial program:
      display means for displaying the commercial program to said viewer and a response request if the commercial program includes a response request; the response request may be received by the receiving means at any time during the commercial program and said display means displays said response request when the commercial program has been viewed in its entirety by the viewer;
      said receiving means receiving a viewer response from the viewer in response to said response request of the commercial program;
      operating means for adding points corresponding to the commercial program to a present points value if said viewer response is received; and
      a memory for storing said present points value, a commercial ID corresponding to the commercial program, and said viewer response;
   wherein if said program is determined as said pay program;
      said display means displaying said present points value from said memory and a points payment request for the pay program;
      said operating means subtracting points corresponding to the pay program from the present points value stored in said memory if said points payment request is approved by the viewer; and
      said display means displaying the pay program to the viewer.

2. The information receiving device according to claim 1, further comprising transmission means for transmitting the viewer response, the present points value, and the commercial ID stored in said memory.

3. A method of viewing programs, comprising:
   a receiving step of receiving a program for viewing by a viewer,
   a determining step of determining whether said program is a commercial program or a pay program;
   wherein if said program is determined as said commercial program:
      a commercial program displaying step of displaying the commercial program to said viewer and a response request if the commercial program includes a response request; the response request may be received at any time during the commercial program and said commercial program displaying step displays said response request when the commercial program has been viewed in its entirety by the viewer;
      a response receiving step of receiving a viewer response from the viewer in response to said response request of the commercial program; wherein if said viewer response is received:
         an operating step of adding points corresponding to the commercial program to a present points value stored in a memory; and
         a storing step of storing said viewer response, said present points value,
      and a commercial ID corresponding to the commercial program in said memory;
   wherein if said program is determined as said pay program:
      a payment displaying step of displaying said present points value from said memory and a points payment request for the pay program;
      wherein if said points payment request is approved by the viewer, points corresponding to the pay program are subtracted from the present points value stored in said memory; and
      a pay program displaying step of displaying the pay program to the viewer.

4. The method according to claim 3, further comprising a step of transmitting the viewer response, the present points value, and the commercial ID stored in said memory.

* * * * *